Dec. 12, 1939.  A. N. GOLDSMITH  2,183,217
PRODUCTION OF STILL OR MOTION PICTURES
Filed March 9, 1935  2 Sheets-Sheet 1
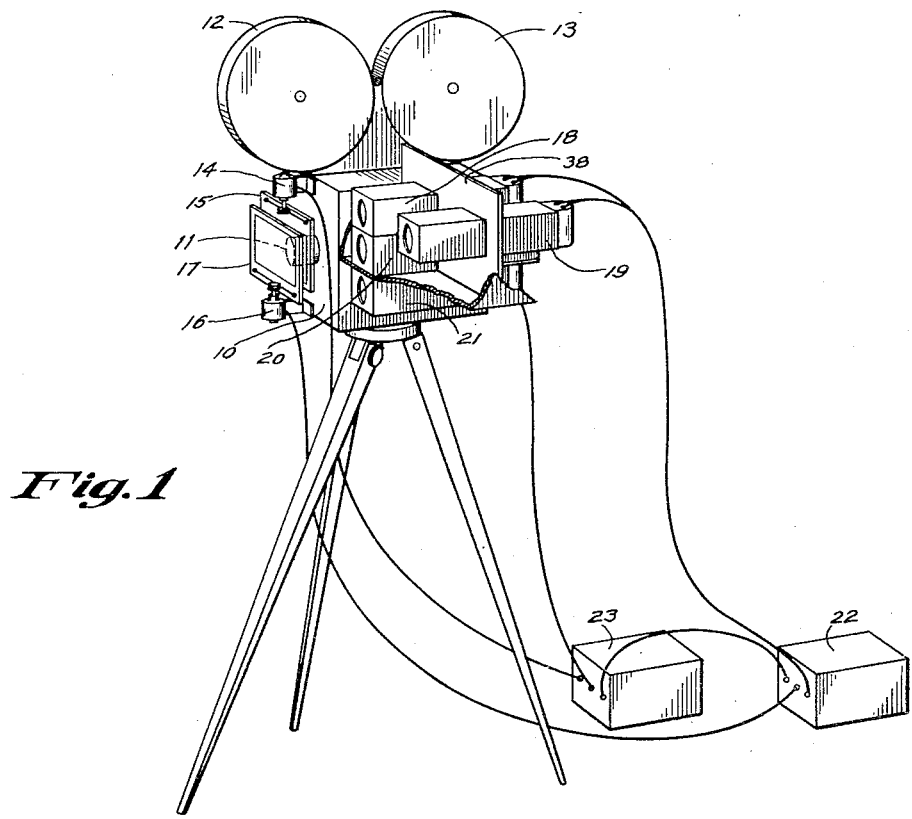
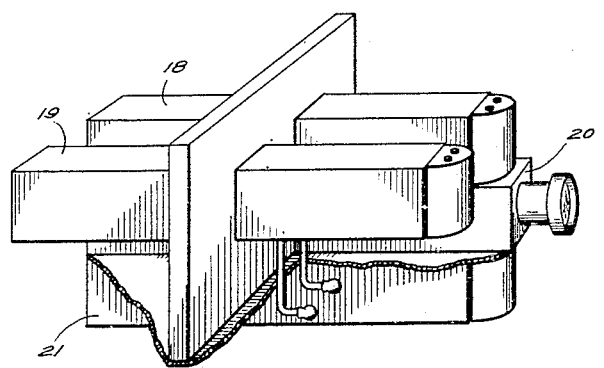
INVENTOR
ALFRED N. GOLDSMITH
BY
ATTORNEY

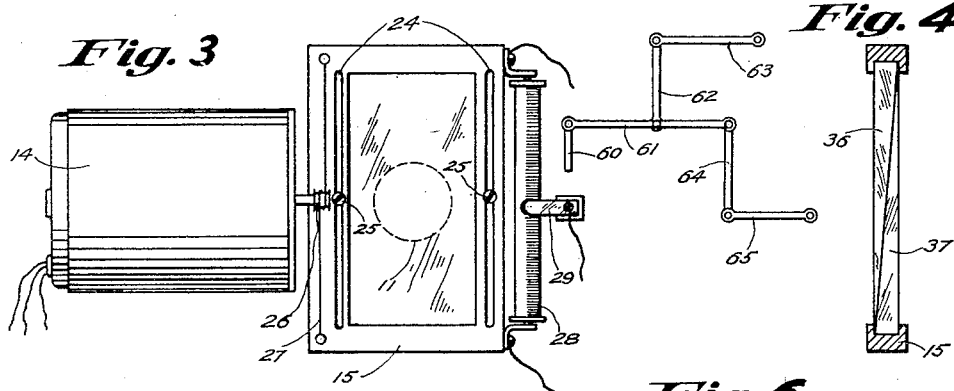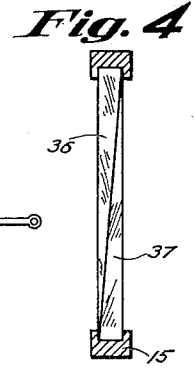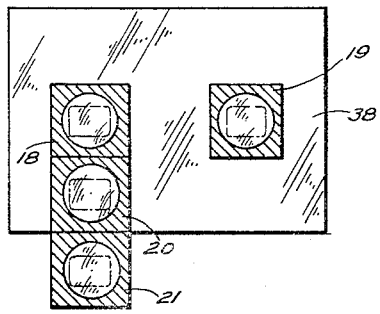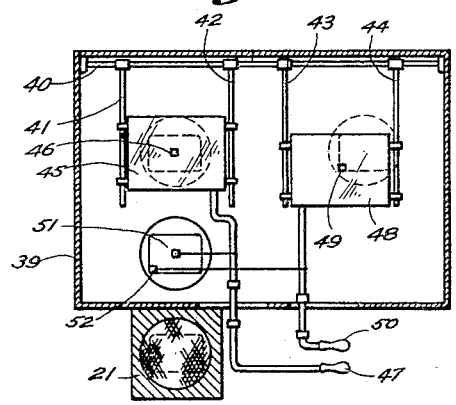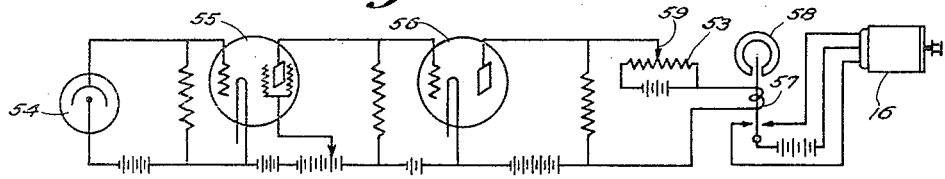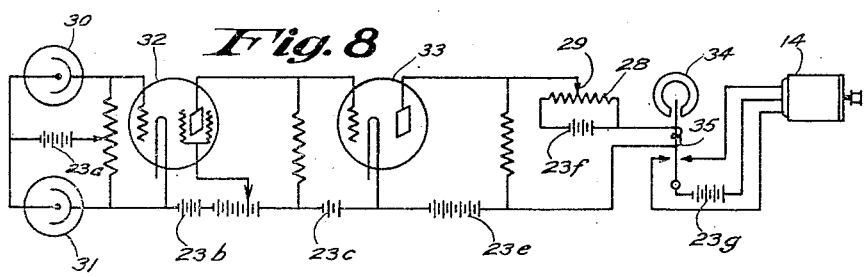
INVENTOR
ALFRED N. GOLDSMITH
BY
ATTORNEY Patented Dec. 12, 1939

2,183,217

UNITED STATES PATENT OFFICE 2,183,217

PRODUCTION OF STILL OR MOTION PICTURES

Alfred N. Goldsmith, New York, N. Y.

Application March 9, 1935, Serial No. 10,181

18 Claims. (Cl. 95—10)

This invention relates to the production of still or motion pictures and the like, and has for its principal object the provision of an improved apparatus and method of operation whereby the picture exposure is maintained substantially constant irrespective of (1) the average illumination of the photographed or object area, (2) the degree of contrast between different parts of this area and (3) various adjustments made by the camera operator.

An important feature of the invention is means for automatically controlling the exposure of a picture in accordance with the average illumination of the object area, the degree of contrast between different parts of this area and the shutter and diaphragm settings of the camera. As hereinafter explained, a part or all of these various features may be utilized depending on the requirements of each particular case.

In the operation of a motion picture camera, it is customary, particularly on interior "shots" with artificial illumination, to adjust the aperture of the diaphragm of the lens in accordance with the depth of focus desired rather than in conformity with the illumination so that either a very slight depth of focus at the object plane or a considerable depth of focus is secured. The shutter is then adjusted to either a narrow or a wide opening in order to determine the degree of sharpness or blur of movement that the subject matter requires. If this does not correspond with the proper exposure, either the illumination is increased to secure adequate exposure, or, if the illumination is adequate and so arranged as to make a decrease thereof inconvenient, a neutral tint filter of the proper density or a variable density neutral tint wedge is placed in front of the lens. It will be apparent that all of these various adjustments require considerable time and afford opportunity for errors, and that the changing of any one of the adjustments necessitates a corresponding change in the others in order to secure proper exposure.

In addition to the problem of correct exposure, the photographer is confronted also with the question of contrast in the negatives. For example, a photograph taken out-of-doors in bright sunshine will present all ranges of illumination from direct sunlight upon a white surface to the intense blackness of an opening into a blackened space as, a coal hole. In a scene taken in the shade on a cloudy day or in-doors, however, the range of contrast is materially less even though the illumination be comparatively intense. To secure proper exposure of the picture under these various conditions is another object of the invention.

Otherwise stated, it is the purpose of the invention to provide an apparatus for automatically measuring the total illumination of the object area hereafter referred to as the subject, to provide an apparatus for measuring the total contrast of the subject, to provide an apparatus for measuring the contrast of the subject between the brightest high light which is to be shown in detail and the deepest shadow which is to be shown in detail, to provide the foregoing means in conjunction with the view finder so that it will be continually apparent to the operator which portions of the subject matter are determining the exposure and contrast, to provide means for automatically adjusting a variable density neutral tint wedge in accordance with the total exposure to be secured, to provide means for automatically adjusting a variable tint constant density wedge in accordance with the degree of contrast to be secured, to provide means for compensating the adjustment of the neutral tint wedge for the shutter adjustments, and to provide means for compensating the adjustment of the neutral tint wedge for the diaphragm adjustment. Indicating means may also be provided in combination with the foregoing adjustments for notifying the operator when any of the adjustments have reached the limits of their travel and further adjustments are required.

The invention will be better understood from the following description when considered in connection with the accompanying drawings, and its scope will be pointed out in the appended claims.

Referring to the drawings:

Fig. 1 is a perspective view of a motion picture camera constructed in accordance with the invention, Fig. 2 is a perspective view of a unitary assembly indicating a possible relation between a view finder, a contrast measuring element and an average illumination measuring element, Fig. 3 illustrates a type of control element suitable for operating a variable density neutral tint light wedge in accordance with the average illumination of the object area or for operating a variable tint constant density light wedge in accordance with the contrast of this area, Fig. 4 is a sectional view of a suitable form of variable density neutral tint or variable tint constant density light wedge, Figs. 5 and 6 are sectional views illustrating the relation between various parts of the apparatus, Fig. 7 is a wiring diagram showing certain details of the means for controlling the operation of the variable density neutral tint light wedge, and Fig. 8 is a similar diagram of the control circuits of the variable tint constant density light wedge.

The motion picture camera of Fig. 1 includes the usual picture head 10 provided with an exposure aperture 11 and with film feed and take-up reels 12 and 13. Mounted adjacent the aperture 11 are a motor 14 for moving a variable tint constant density light wedge 15 transversely of the aperture 11 and a motor 16 for similarly moving a variable density neutral tint light wedge 17.

Also supported with a picture head 10 are casings 18, 19, 20 and 21. As hereinafter explained in greater detail, the casings 18 and 19 contain means for exposing a pair of photocells respectively to the darkest spot to be shown in detail and brightest spot to be shown in detail, casing 21 contains means for exposing a photocell to the average illumination of the area to be photographed and casing 20 encloses a view finder which enables the camera operator to observe the object or scene and to determine the light and dark spots selected for contrast. Operating current is supplied to the motors 14 and 16 and to the photocell current amplifier assembly 22 from a battery or other source 23.

Since the operating mechanisms of the variable tint constant density and neutral tint variable density light wedges may be similar, only one of them will be described. As indicated by Fig. 3, the variable tint constant density wedge 15 is provided with grooves 24 arranged to cooperate with screws 25 and guide the wedge in its movement across the field of the aperture 11. The wedge 15 is moved by the motor 14 through any suitable coupling illustrated as a pulley 26 and a belt 27 anchored to opposite edges of the wedge. Mounted at the edge of wedge 15 is a rheostat 28 which forms a part of the control circuit of motor 14 and is provided with a contact 29 which may or may not be positioned in accordance with the shutter and diaphragm settings depending on whether or not the apparatus is to be automatically operated in accordance with these adjustments.

Fig. 8 illustrates the complete control circuit of the motor 14. This circuit includes light responsive devices or photocells 30 and 31 enclosed respectively in casing 18 and casing 19 of Fig. 1 and oppositely connected in the input circuit of an amplifier 32 through which current is supplied to an amplifier 33 and thence to resistor 28 and a polarized relay 34 which function to reverse the connections of the motor.

It will be apparent that the resultant potential applied to the input circuit of the amplifier 32 is determined by the difference in the illumination of the photocells 30 and 31, that the output potential of the amplifier 33 varies in accordance with this resultant potential, and that the current supplied to the operating coil 35 of relay 34 is the resultant of the amplifier output potential and the opposed potential drop produced in resistor 28 by the battery section 23f.

When the amplifier output and resistor drop potentials are equal, no current is supplied to the relay operating coil 35, the motor 14 is unenergized and the variable tint constant density light wedge 15 is stationary. When the illumination of the photocells 30 and 31 differ, however the amplifier output potential increases, current is supplied to the relay operating coil 35, the motor 14 is energized and the wedge 15 and resistor 28 are moved with respect to the picture aperture 11 to a position where the resistor drop is again equal to the amplifier output potential. The apparatus is so constructed and calibrated that the wedge 15 is always maintained at a position where it corrects the exposure in accordance with the contrast between the brightest and darkest spots to be shown in detail. Thus further increase in the difference between the illumination of the cells 30 and 31 continues the above described movement of the motor 14, wedge 15 and resistor 28 and decrease in this difference of illumination produces reverse movement of these elements, the effect always being to correct the film exposure with respect to the contrast between the brightest and darkest spots to be shown in detail.

A convenient reference point for the adjustment of all of these exposure controlling means is the exposure normally produced by the exciter lamp of a sound recording system which might be used in the camera, as the sound recording lamp is adjusted to give the most desirable exposure of a sound record when developed to a certain contrast such as a gamma of unit $g$. The several screens and potentiometers are then adjusted to give the most desirable average negative with the same development.

The range of the variable tint constant density wedge 15 or contrast filter depends upon the type of film stock to be used. If the type of film known as duplicating stock is used which is specifically designed for the purpose of producing selective contrasts according to the color of the exposing light than the normal range of color filters for such stock, as specified by the manufacturers, is used. If the emulsion is dyed a yellow, then the color screen to give maximum range of contrast should range from a red to a deep blue. If the tinting of the emulsion tends more toward the red or blue ends of the spectrum, then the range of the color screen may be shifted correspondingly. It will be apparent that the range of the color screen may be made sufficiently great to cover all the usual varieties of film, and that its action may be then restricted to the portion of the range which is useful with the particular film being used by proper choice of the range of the potentiometer 28 and the manual adjustment of the contact 29 in accordance with the particular film. If, for example, the voltage range covered by the potentiometer is twice as great as that covered by the output tube, then this tube can only actuate the screen over half of its total length, and this proportion of its length may be selected at any desired point on the screen.

Fig. 4 is a sectional view of the wedge or filter 15 wherein the section 36 may be colored red and the section 37 may be colored blue for use with a yellow tinted film.

As indicated by Figs. 5 and 6, the contrast view finder casings 18 and 19, visual view finder casing 20 and the average illumination view finder 21 may be mounted together on a support 38 to form a unitary structure. A casing 39 (Fig. 6) may enclose the contrast and visual finders together with the mechanism for selecting and indicating to the light and dark spots to be contrasted. This mechanism includes a rod 40 extending between the side walls of the casing 39 and depending rods 41 to 44 provided at their upper ends with collars slidable along the rod 40. A shutter 45 slidable horizontally along the rod 40 together with rods 41 and 42 and slidable vertically along rods 41 and 42 is provided with an aperture 46 and a handle 47 registering this aperture with the brightest spot to be shown in detail. A shutter 48 likewise slidable along rods 40, 43 and 44 is provided with an aperture 49 and handle 50 for registering this aperture with the darkest spot to be shown in detail. Associated with the contrast selector handles 47 and 50 are indicators 51 and 52 for indicating to the operator in the visual view finder the points of the object or scene selected for contrast.

As will be readily understood from the foregoing description, the light transmitted through the bright spot aperture 46 illuminates the photocell 30, the light transmitted through the dark spot aperture 49 illuminates the photocell 31 and the variable tint constant density filter or wedge 15 is adjusted, as previously explained, to make at the picture aperture 11 the exposure correction required for the selected contrast.

The variable density neutral tint filter or wedge 17 (Fig. 1) has not been illustrated in detail for the reason that it is similar to the variable tint constant density wedge 15 except that it has associated with it a resistor 53 (Fig. 7) and varies in density from dark to light instead of from red to green. Movement of the wedge 17 is effected by a motor 16 which is controlled in accordance with the average illumination of the object. The control circuit of the motor 16 includes a photocell 54 which is subjected to average light reflected from the object through the view finder 21. The current of photocell 54 is amplified by amplifiers 55 and 56 and is supplied through the resistor 53 to the operating coil 57 of a polarized relay 58 which moves the filter 17 and resistor 53 transversely of the picture aperture to correct the exposure for the average illumination of the object.

The resistor 53 is provided with an intermediate contact 59 (similar to the contact 29 of resistor 28) which may be coupled through suitable link mechanisms to the camera diaphragm and shutter control elements for maintaining correct exposure irrespective of adjustments made by the operator to change the camera focus or to change the blur of a moving object.

A suitable type of link mechanism for this purpose shown in Fig. 3 includes a lever 60 adapted to be pivoted at its lower end to the contact 59 and at its upper end to a lever 61 which is coupled through levers 62 and 63 to the shutter control mechanism and through levers 64 and 65 to the diaphragm control mechanism. Thus movement of the left hand end of lever 65 upwardly to open the diaphragm moves the contact 59 downwardly along the rheostat 53 and the screen 17 is moved downwardly to decrease the average illumination at aperture 11 and vice versa. Similarly movement of the left hand end of lever 63 downwardly to increase the shutter opening moves the contact 59 downwardly along the resistor 53 and the screen 17 is moved downwardly to decrease the average illumination and vice versa. Any separate or simultaneous adjustment of the diaphragm and shutter controls by the operator thus results in automatic control of the filter 17 to maintain the proper exposure. It will of course be understood that the lever system 60 to 65 may be omitted and proper adjustment of the contact 59 be made by the operator if desired.

Having thus described my invention, I claim:

1. The combination of means operable to expose a light sensitive surface to an object to be photographed, and means adapted to be operated in response to the contrast between different selected areas of said object for controlling the contrast in said exposure, and means controlled by the contrast between said areas for actuating said controlling means.

2. The combination of a camera provided with a diaphragm operable to expose a light sensitive surface to an object to be photographed, means including a variable density neutral tint light wedge responsive to the average brightness of said object for regulating said exposure, and a coupling interposed between said diaphragm and said brightness responsive means for adjusting said means in accordance with the opening of said diaphragm.

3. The combination of a camera provided with a shutter operable to expose a light sensitive surface to an object to be photographed, means including a variable density neutral tint light wedge responsive to the average brightness of said object for regulating said exposure, and a coupling interposed between said shutter and said brightness responsive means for adjusting said means in accordance with the setting of said shutter.

4. The combination of means operable to expose a light sensitive surface to an object to be photographed, a variable tint constant density filter movable between said object and said surface, and means responsive to contrast between different selected bright and dark areas of said object for moving said filter.

5. The combination of means operable to expose a light sensitive surface to an object to be photographed, a variable tint constant density filter movable between said object and said surface, and means including a pair of oppositely connected light sensitive elements adapted to receive light from selected bright and dark areas of said object, an amplifier connected to and controlled by said elements, and means connected to and controlled by said amplifier for moving said filter in response to contrast between different selected bright and dark areas of said object.

6. The combination of means operable to expose a light sensitive surface to an object to be photographed, a variable density neutral tint filter movable between said object and said surface, and means including a photo-electric device adapted to be illuminated by light reflected from said object, an amplifier controlled by said device and means controlled by said amplifier for moving said filter to vary said exposure in accordance with the average illumination of said object.

7. The combination of means operable to expose a light sensitive surface to an object to be photographed, means responsive to the contrast between different selected areas of said object for controlling said exposure, a view finder, and means operable to indicate in said finder the locations of said selected areas.

8. A camera including a picture aperture and a contrast finder including a pair of photo-electric devices, means operable to illuminate said devices respectively from selected bright and dark areas of the object to be photographed, means for controlling the exposure of said object to said aperture, means for actuating said controlling means and means oppositely connecting said devices to said actuating means whereby said controlling means will be actuated in accordance with the difference between the currents of said devices.

9. In combination, a camera having a diaphragm, means comprising a neutral tint wedge movable between the exposure area of the camera and the object to be photographed, and means interconnecting the said diaphragm and the said wedge for adjusting the said wedge in reciprocal accordance with the adjustment of the diaphragm whereby the exposure remains uniform irrespective of the diaphragm setting.

10. In combination, a camera provided with a shutter for exposing a light sensitive surface to an object, a variable density wedge movable between the light sensitive surface and the object in response to the average brightness of the object for regulating the exposure and a coupling interconnecting said shutter and said wedge whereby said wedge is adjusted in inverse relation to the adjustment of the shutter to maintain the exposure constant independently of the shutter setting.

11. The combination of a camera provided with a diaphragm and a shutter, means operable in response to the average brightness of the object to be photographed for regulating the exposure and means interconnecting said diaphragm, said shutter and said regulating means for controlling the regulating means in inverse accordance with both the diaphragm and shutter settings whereby the exposure is maintained constant irrespective of the setting of either the diaphragm or the shutter.

12. The combination of a camera provided with a shutter and a diaphragm, a variable density wedge interposed between the exposure area of said camera and the object to be photographed and means interconnecting the said shutter, the said diaphragm and the said wedge and moving the said wedge in inverse accordance with the adjustment of both the shutter and the diaphragm whereby the exposure is kept constant independent of both the shutter and diaphragm settings.

13. In combination, a camera, a variable tint constant density filter movable in relation to said camera to vary the exposure, means defining small areas of the image area to be photographed, photo-electric means oppositely controlled by light from said small image areas and means actuated by said photo-electric means for moving said filter.

14. In combination, a photographic camera, a variable tint constant density filter movable in relation to said camera to vary the exposure in accordance with contrast in the object to be photographed, means defining small separated areas of the image area, photo-electric means in cooperative relation with said defining means and adapted to be actuated by illumination from said small areas, an amplifier, means oppositely connecting said photo-electric means to said amplifier for actuating said amplifier in accordance with the difference of output of said photo-electric means, and means controlled by said amplifier for moving said filter, whereby said filter is moved in response to contrast between said defined areas.

15. In combination, a photographic camera, a variable density neutral tint filter movable in relation to said camera to vary the exposure, a photo-electric cell, means for directing illumination from the area to be photographed to said photo-electric cell whereby the current through said cell varies in accordance with the average brightness of said area, an amplifier, means connecting said photo-electric cell to said amplifier and means connected to and controlled by said amplifier for moving said filter to vary the exposure in accordance with the average brightness of said area.

16. In combination, a photographic camera, means for defining different areas of an object area to be photographed and transmitting light from said areas only, photo-electric means in cooperative relation with said defining means and adapted to be operated by the light transmitted by said defining means, an amplifier, means oppositely connecting said photo-electric means to said amplifier for actuating said amplifier in response to the difference in output of said photo-electric means, a constant density variable tint wedge between said camera and said object area, means connected to and controlled by said amplifier for shifting said wedge in accordance with the said difference of output, a view finder and means in said view finder for indicating the location of the defined areas in the object field.

17. The combination of a camera, means defining small areas of an image area to be photographed, a variable tint constant density light wedge movable across the exposure area of said camera, and means operable to move said wedge in response to contrast between the brightness of said areas.

18. The combination of a camera, means defining small areas of an image area to be photographed, a variable tint constant density light wedge movable across the exposure area of said camera, photoelectric means arranged to be illuminated by said areas, and means controlled by said photoelectric means for moving said wedge in response to contrast between the brightness of said areas.

ALFRED N. GOLDSMITH.